(12) United States Patent
Behrens

(10) Patent No.: US 10,414,290 B2
(45) Date of Patent: Sep. 17, 2019

(54) OCCUPANT SUPPORT FOR A VEHICLE

(71) Applicant: FAURECIA AUTOSITZE GMBH, Stadthagen (DE)

(72) Inventor: Meinhard Behrens, Wiedensahl (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 142 days.

(21) Appl. No.: 15/804,390

(22) Filed: Nov. 6, 2017

(65) Prior Publication Data

US 2018/0126873 A1 May 10, 2018

(30) Foreign Application Priority Data

Nov. 7, 2016 (DE) .................. 10 2016 121 150

(51) Int. Cl.
*B60N 2/00* (2006.01)
*B60N 2/06* (2006.01)
*B60N 2/02* (2006.01)

(52) U.S. Cl.
CPC ........... *B60N 2/002* (2013.01); *B60N 2/0244* (2013.01); *B60N 2/06* (2013.01); *B60N 2/067* (2013.01)

(58) Field of Classification Search
CPC ........ B60N 2/002; B60N 2/0244; B60N 2/06; B60N 2/067
See application file for complete search history.

(56) References Cited

U.S. PATENT DOCUMENTS

| | | | |
|---|---|---|---|
| 9,227,531 B2 * | 1/2016 | Cuddihy | B60N 2/203 |
| 2005/0248136 A1 * | 11/2005 | Breed | B60R 21/0152 |
| | | | 280/735 |
| 2007/0252423 A1 | 11/2007 | Schulz | |
| 2012/0318949 A1 | 12/2012 | Braun | |
| 2015/0375865 A1 | 12/2015 | Fischer | |
| 2016/0129868 A1 * | 5/2016 | Choi | B60R 21/013 |
| | | | 280/735 |
| 2016/0159253 A1 * | 6/2016 | Frasher | B60N 2/10 |
| | | | 296/65.01 |
| 2016/0264021 A1 * | 9/2016 | Gillett | B60K 1/04 |
| 2017/0158086 A1 * | 6/2017 | Kwon | B60N 2/809 |
| 2017/0364629 A1 * | 12/2017 | Tarte | B60N 2/002 |
| 2018/0154799 A1 * | 6/2018 | Lota | B60N 2/0224 |
| 2018/0186266 A1 * | 7/2018 | Fitzpatrick | B60N 3/063 |
| 2018/0201213 A1 * | 7/2018 | Gandhi | B60N 2/0276 |
| 2018/0222490 A1 * | 8/2018 | Ishihara | B60W 50/14 |
| 2018/0244175 A1 * | 8/2018 | Tan | B60N 2/0248 |
| 2018/0272900 A1 * | 9/2018 | Fitzpatrick | B60N 3/001 |
| 2018/0334062 A1 * | 11/2018 | Park | B60N 2/501 |

(Continued)

FOREIGN PATENT DOCUMENTS

| | | |
|---|---|---|
| DE | 10359019 | 3/2013 |
| DE | 102012010243 | 9/2014 |
| DE | 102014006293 | 10/2015 |

(Continued)

OTHER PUBLICATIONS

German Office Action for DE 10 2016 121 150.8 established Apr. 24, 2017, 601-678 DE, no English translation available, 7 pages.

*Primary Examiner* — Calvin Cheung

(74) *Attorney, Agent, or Firm* — Barnes & Thornburg LLP

(57) ABSTRACT

A driver's seat of a motor vehicle may be moved by means of a drive from a rear relaxing position provided for driverless driving into a front driving position.

8 Claims, 5 Drawing Sheets

(56) References Cited

U.S. PATENT DOCUMENTS

2018/0354391 A1\* 12/2018 Guy .................. B60N 2/0722
2019/0118681 A1\* 4/2019 Daniel ............... B60N 2/42745

FOREIGN PATENT DOCUMENTS

| DE | 102015014138 | | | 4/2016 | |
|----|--------------|---|---|--------|---|
| EP | 3000651 | | | 3/2016 | |
| GB | 2556669 | A | \* | 6/2018 | ............ B60W 40/08 |
| JP | 200426013 | | | 1/2004 | |

\* cited by examiner

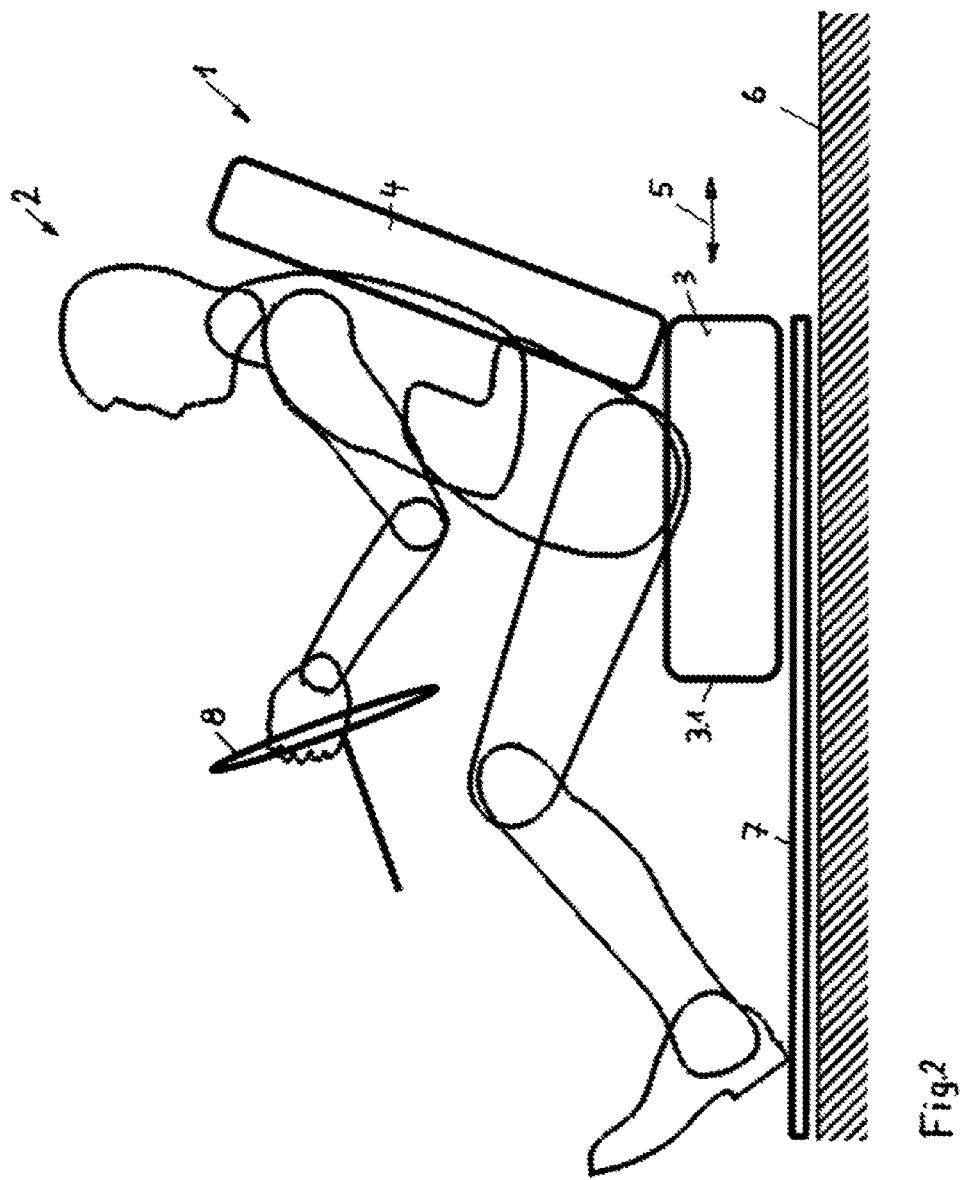

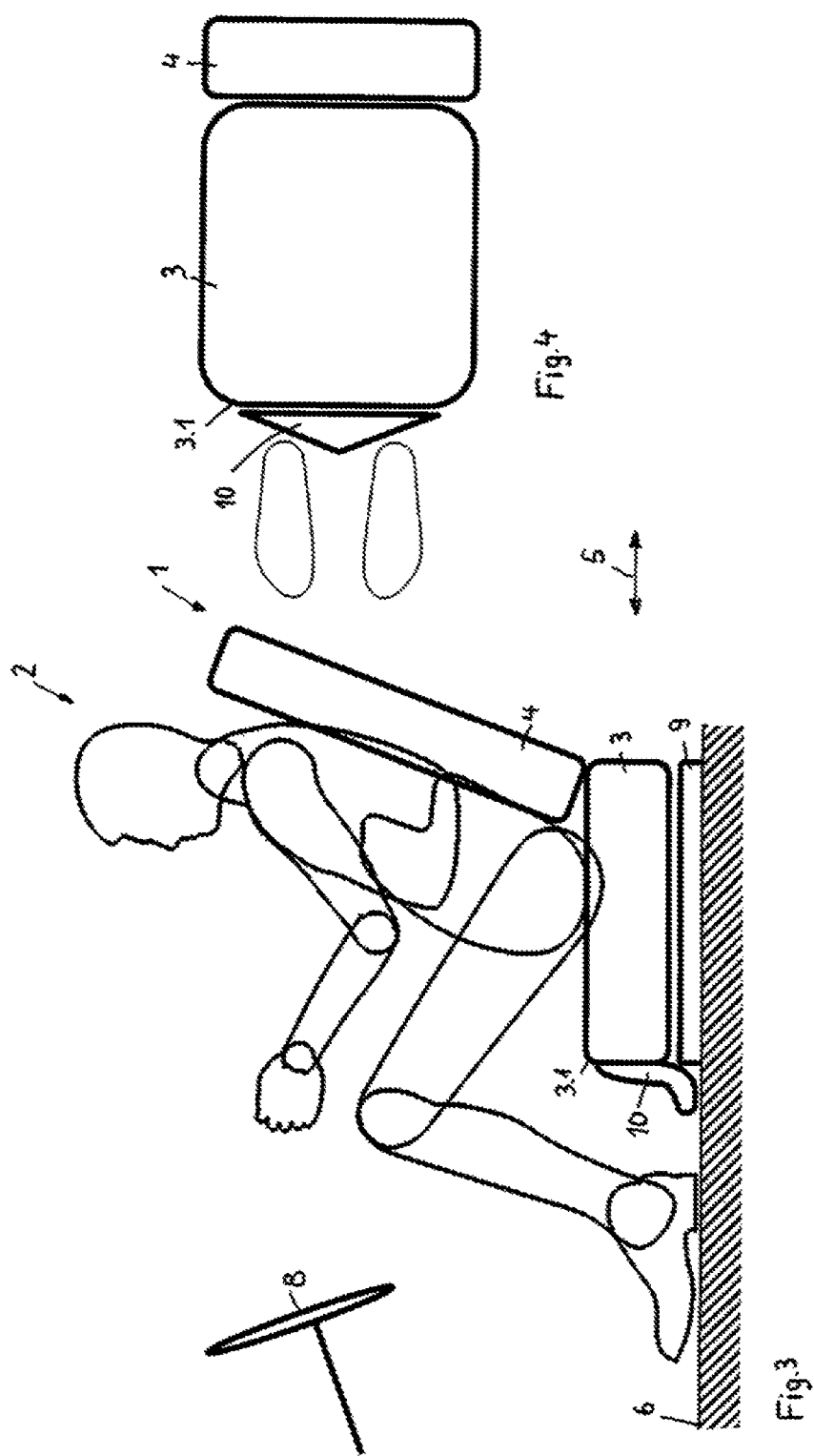

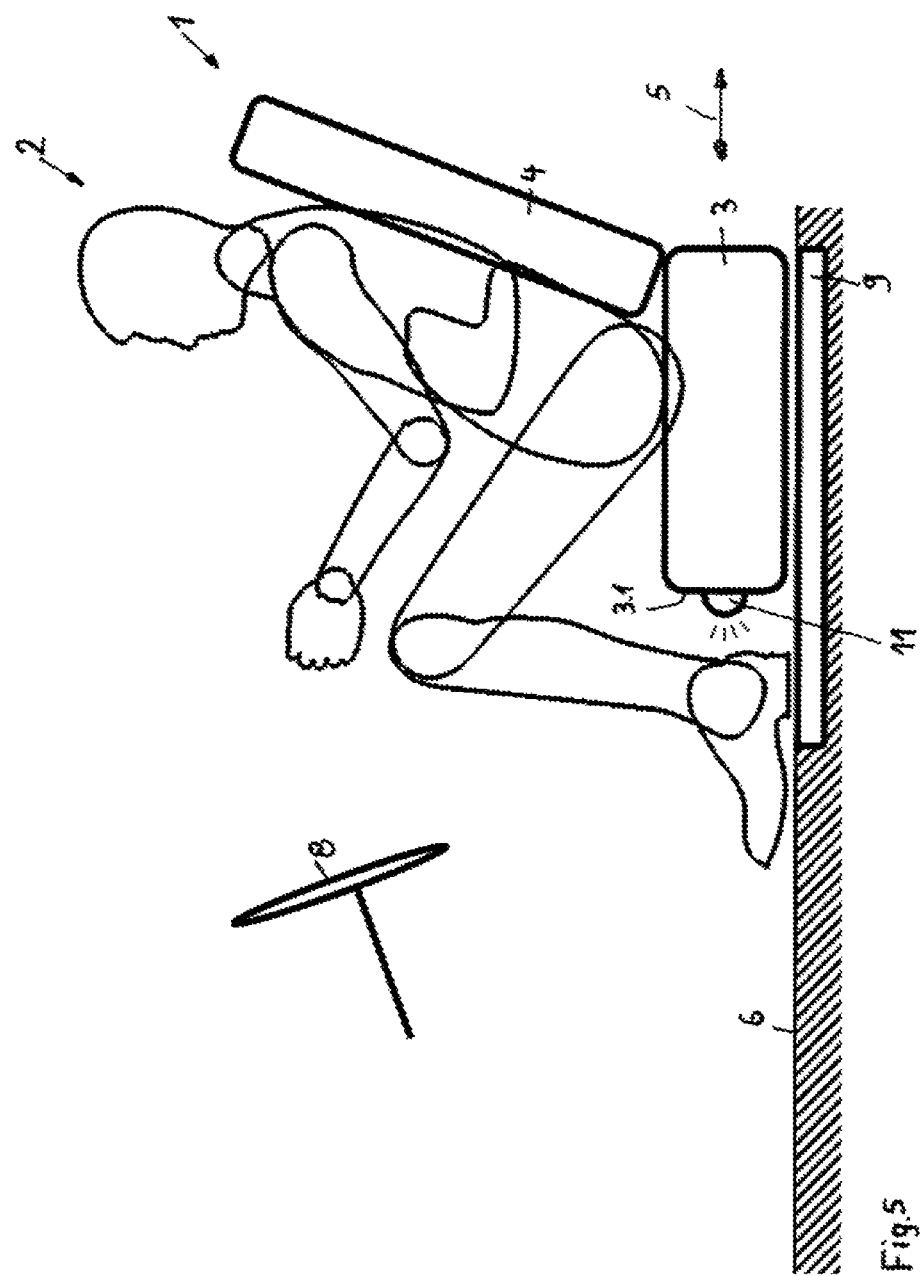

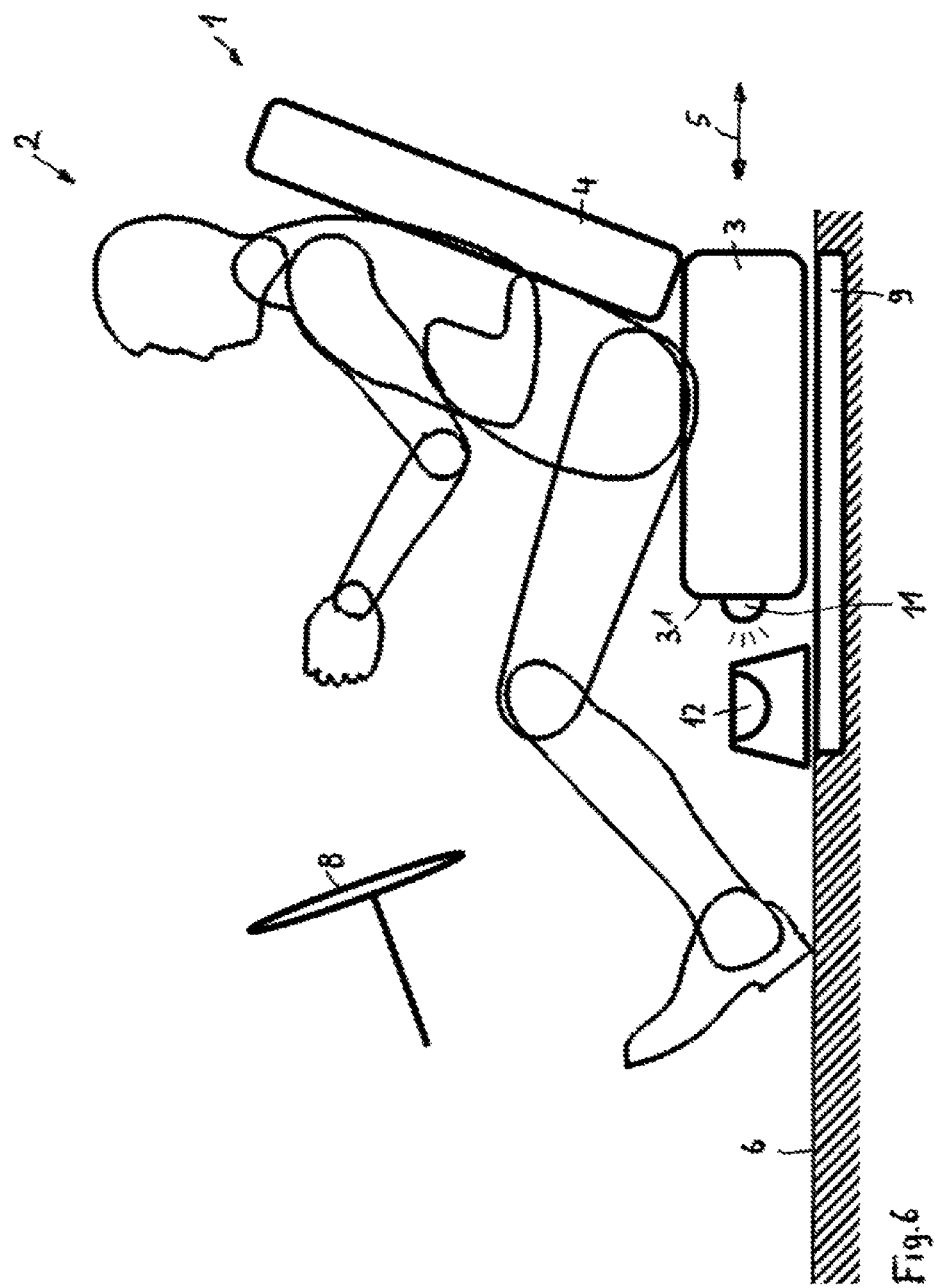

OCCUPANT SUPPORT FOR A VEHICLE

PRIORITY CLAIM

This application claims priority to German Patent Application No. DE 10 2016 121 150.8, filed Nov. 7, 2016, which is expressly incorporated by reference herein.

BACKGROUND

The present disclosure relates to a seat, and particularly to a vehicle seat. More particularly, the present disclosure relates to a vehicle seat movable in a vehicle.

SUMMARY

According to the present disclosure, an occupant support includes a vehicle seat and a drive. The drive is configured to move the vehicle in a vehicle relative to the floor.

In illustrative embodiments, the drive moves the vehicle seat from a relaxing position to a driving position. The vehicle seat is adapted to support an occupant thereon in the driving position to allow the occupant to drive the vehicle. The vehicle seat is adapted to support an occupant thereon in the relaxing position to allow the occupant to relax and not drive the vehicle. The relaxing position may be used when a vehicle is in an autonomous or driverless mode of operation.

In illustrative embodiments, the occupant support further includes a sensor coupled to the vehicle seat. The sensor is configured to detect obstacles in a travel path between the driving position and the resting position. The sensor is configured to send an output signal in response to detecting an obstacle in the travel path.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 2 is a diagrammatic view of a driver's seat included in a vehicle;

FIG. 3 is a diagrammatic view of another embodiment of driver's seat included in a vehicle;

FIG. 4 is a plan view of the driver's seat of FIG. 3;

FIG. 5 is a diagrammatic view of another embodiment of a driver's seat included in a vehicle; and FIG. 6 is a view similar to FIG. 5 showing the driver's seat in a different position.

DETAILED DESCRIPTION

Figure 1:
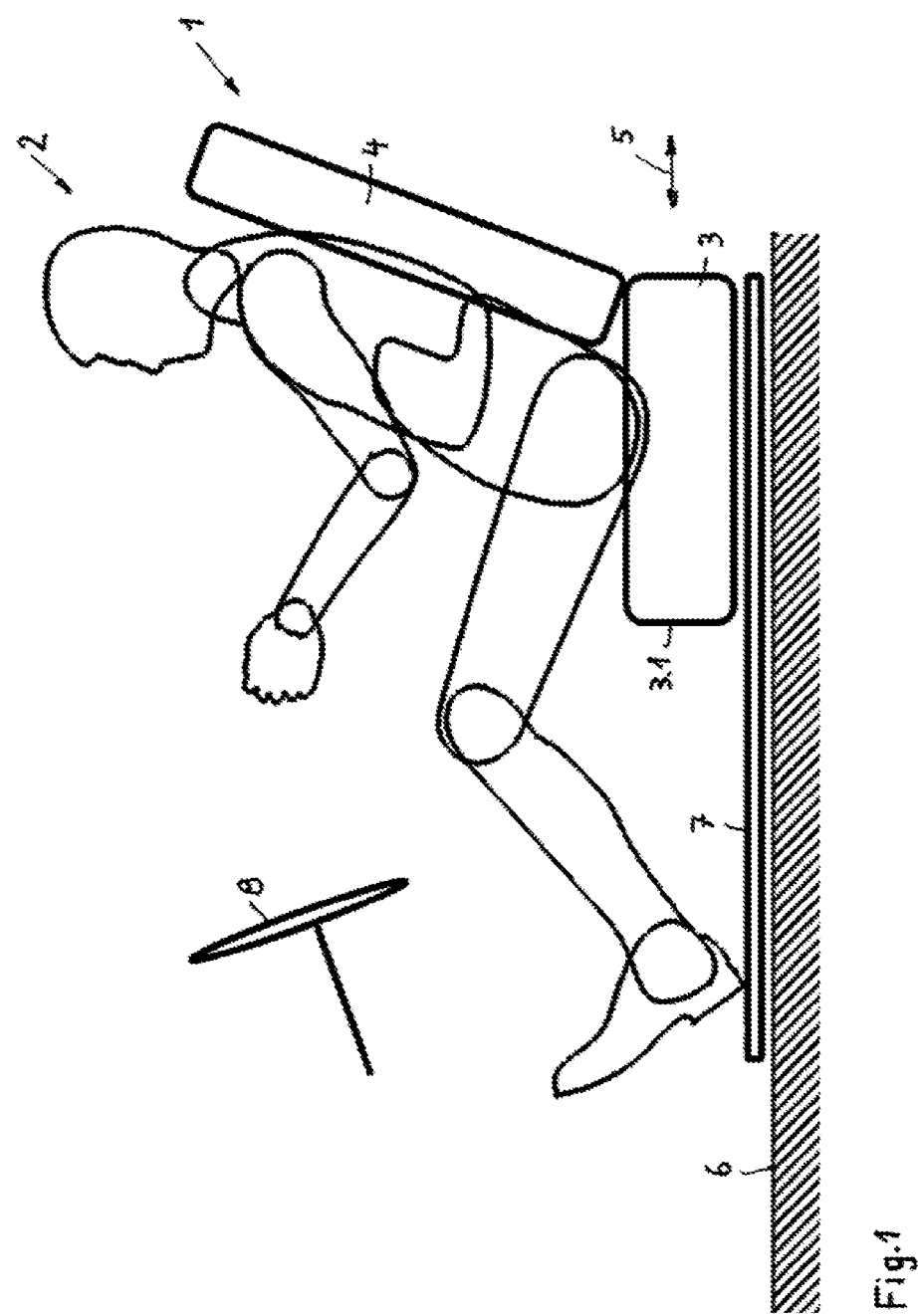
FIG. 1 is a diagrammatic view of a driver's seat included in a vehicle.

A driver's seat of a motor vehicle is arranged on a frame. This frame has guide rails on both sides which run in parallel to one another and in the longitudinal vehicle direction. The seat can be moved on these guide rails and locked in different longitudinal setting positions. An accelerator and a brake pedal are articulated to the frame of the vehicle and are thereby longitudinally movable along with said frame. In order to set a desired spacing between the driver and the pedals, the seat is correspondingly moved longitudinally on the frame. The frame can then likewise be moved longitudinally on the rails secured to the vehicle floor together with the seat and the pedals, so that a desired spacing of the driver in respect of the steering wheel can be set.

In one example, the driver's seat may be used where the driver himself drives, steers, accelerates, brakes, etc. In another example, the vehicle may be a driverless vehicle in which driving of the motor vehicle is taken over by assistance systems included in the vehicle either permanently or intermittently. If the driving functions are no longer being managed by the systems, the driver may be asked to take over the driving of the vehicle.

Because driverless driving means that a driver is no longer involved in the driving operation, the driver is able to turn their attention to other activities during driving, e.g. reading or working on a laptop. These or other activities are impeded by the spatial proximity of the steering wheel to the driver and the limited amount of space available as a result. During driverless operation of the motor vehicle, the driver's seat may be moved away from the steering wheel into a rear relaxing position.

If the assistance systems fail or indicate, for whatever reason, that they are not capable of dealing with a driving or traffic situation, the driver's seat may move automatically and very quickly out of the relaxing position into the driving position, so that the driver can engage actively with the driving process. The driving position in this case should be understood to mean a position of the driver's seat in which a driver can drive the vehicle in a comfortable, sitting position.

A driver's seat of a motor vehicle may be moved by means of a drive from a rear relaxing position provided for driverless driving into a front driving position. In this case, the drive automatically switches on when triggered. Sensors are provided in the vehicle which monitor the travelling path of the driver's seat and limit the adjusting movement when an object is identified in the travelling path.

The vehicle seat of the present disclosure allows for movement of the vehicle seat from the rear relaxing position to the front driving position without objects in the vehicle or the occupant interfering with the movement. The driver's seat is fitted with devices which block a driver's feet or objects located in front of the seat from becoming trapped between the forward-moving seat and vehicle body parts when the drive of driver's seat switches on automatically if it is triggered (e.g. if the assistance systems for driverless driving should malfunction, break down, or be switched off).

In accordance with the present disclosure, a sensor for distance measuring is arranged on the front side of the seat part of the driver's seat. The sensor detects obstacles such as the driver's feet or objects on the travelling path of the seat and triggers an alarm when the driver's feet or objects are in a hazardous position. This alarm causes the driver to alter the position of his feet or to remove the object. The sensor becomes less sensitive as the driver's seat approaches the driving position.

FIG. 5 shows a side view of a driver's seat in the relaxing position with the driver sitting in it in one embodiment of the present disclosure. FIG. 6 is a view similar to FIG. 5 of showing the driver's seat in a different position. The Figures show a driver's seat 1 with a driver 2 sitting in it. The driver's seat 1 has a seat part 3 and a backrest 4. It is directly or indirectly mounted such that it can be moved in both directions (double arrow 5) along the vehicle floor 6.

In the embodiment according to FIGS. 1 and 2, the seat part 3 is rigidly connected to a plate 7, i.e. the plate 7 and the seat part 3 cannot be moved relative to one another. The plate 7 projects forwards beyond the front edge 3.1 of the seat part 3, such that the feet of the driver 2 stand on the plate 7 in any normal sitting position. The plate 7 is mounted on the vehicle floor 6 in a longitudinally movable manner (double arrow 5).

FIG. 1 shows the driver's seat 1 in its relaxing position. In this position the driver's seat 1 is moved so far back that there is sufficient space between the driver 2 and a steering wheel 8 for the driver 2 to perform various activities.

If the driverless driving systems fail or go out of operation, the driver 2 should be become involved in the active driving operation very quickly. For this purpose, the plate 7, and with it the driver's seat 1, is moved in a driven manner by a drive which is not shown forwards into a driving position which is shown in FIG. 2. In this position, the driver 2 may grip the steering wheel 8 and use the pedals (accelerator, brake) which are not shown. Because the feet of the driver 2 are standing on the plate 7, the spacing between the feet and the seat part 3 is retained when the driver's seat 1 moves forward, so that any trapping of the feet between the plate 7 and the seat part 3 is minimized.

A further embodiment is shown in FIGS. 3 and 4. The seat part 3 of the driver's seat 1 in this case is directly movable in both longitudinal directions (double arrow 5) on rails 9 mounted on the vehicle floor 6 by a drive which is likewise not depicted. On the front side 3.1 of the seat part 3 is mounted a faceplate 10. The lower edge of the faceplate 10 ends just above the vehicle floor 6, so that there is only a small gap between the faceplate 10 and the vehicle floor 6. The faceplate 10 is arched forwards in the region of its lower edge, wherein the edge extends in a wedge-shaped manner on both sides towards the center. This snowplow-like configuration of the faceplate 10 is suggested in FIGS. 3 and 4.

FIG. 3 shows the driver's seat 1 in a relaxing position. The feet of the driver 2 rest on the vehicle floor 6 and are at a relatively short distance from the front side 3.1 of the seat part 3. If the driver's seat 1 now moves out of the relaxing position into the driving position, the gap between the front side 3.1 of the seat part 3 and the feet of the driver 2 diminishes, because the feet of the driver 2 remain at the same point on the vehicle floor 6 during these seat movement.

FIG. 4 shows the situation just before the faceplate 10 strikes the feet of the driver 2. If the feet are in contact with the faceplate 10, they are moved forward together with the seat 1, wherein the shape of the faceplate 10 ensures that the feet are not pressed against the vehicle floor 6, but instead are lifted off it. In this case, any trapping of the feet between the vehicle floor 6 and the seat part 3 is minimized.

In both embodiments, the driver's seat 1 is fitted with a control device which is not shown and which controls the drive in such a manner that the driver's seat 1 moves at a decreasing speed from the relaxing position into the driving position, i.e. at the start of the travelling path of the driver's seat 1 the speed is quite high and at the end it is relatively low. This means that, on the one hand, a rapid movement of the driver's seat into the driving position is achieved and, on the other hand, the driver is blocked from being slung forward when the driver's seat 1 stops.

The drive of the driver's seat 1 is provided with an overload protection which is not shown and which disconnects the drive as the driver's seat 1 approaches the driving position and the adjustment forces become smaller and smaller. The consequence of this is that the overload protection only disconnects the drive when the driver is at a great distance from the driving position when there are high adjustment forces, while it reacts earlier and earlier as it approaches the driving position.

In FIGS. 5 and 6, an exemplary embodiment of the present disclosure is shown in two different situations. As in the preceding embodiment, here too the seat part 3 is mounted in a longitudinally movable manner in both directions (double arrow 5) on rails 9 mounted on the vehicle floor 6. On the front side 3.1 of the seat part 3, a sensor 11 is arranged for distance measurement.

FIG. 5 shows the driver's seat 1 in its relaxing position. The feet of the driver 2 are on the vehicle floor 6 and are only a small distance from the front side 3.1 of the seat part 3. If the driver's seat 1 now moved forwards out of the relaxing position into the driving position, the seat part 3 would travel towards the feet of the driver 2. However, the sensor 11 is configured to detect the short distance of the feet from the seat part 3 and triggers the alarm, which should signal to the driver 2 to adjust the position of his legs.

In FIG. 6 the position has changed compared with FIG. 5, insofar as the feet are at a collision-free distance from the seat part 3, but between the feet and the seat part 3 is an object 12 is located at a short distance from the seat part 3 on the vehicle floor 6. If the driver's seat 1 moved forward in this position, the seat part 3 would, in the absence of a sensor 11, move towards the object 12 and possibly trap it or move the object 12 towards the feet of the driver 2, so that they could become jammed between the object and the pedals. The built-in sensor 11 blocks this situation from occurring. The sensor promptly detects the offending object 12 and triggers an alarm. The sensitivity of the sensor 11 diminishes increasingly as the driver's seat 1 moves towards the driving position and is completely inactive in the driving position.

The present disclosure addresses the issue of providing a driver's seat of the generic kind which allows a hazard-free movement of the seat from the relaxing position into the driving position.

The following numbered clauses include embodiments that are contemplated and non-limiting:

Clause 1. A driver's seat (1) of a motor vehicle which can be moved by a drive from a rear relaxing position provided for driverless driving into a front driving position, wherein the drive automatically switches on when triggered, wherein a sensor (11) configured to measure distance is arranged on a front side (3.1) of a seat part (3) of the driver's seat (1), the sensor (11) detects obstacles such as the feet of the driver or objects (12) on a travelling path of the driver's seat (1) and triggers an alarm when the driver's feet or objects (12) are in a hazardous position, wherein the sensor (11) becomes less sensitive as the driver's seat (1) approaches the driving position.

Clause 2. The driver's seat (1) of clause 1, wherein the drive decreases a speed at which the driver's seat (1) moves as the driver's seat (1) approaches the driving position.

Clause 3. The driver's seat (1) of clause 1, wherein the drive provides a first adjustment force to move the driver's seat (1) from the rear relaxing position to the driving position when the driver's seat (1) is closer to the rear relaxing position than the driving position, the drive provides a second adjustment force to the driver's seat (1) to move the driver's seat from the rear relaxing position to the driving position when the driver's seat (1) is closer to the driving position than the rear relaxing position, and the first force is greater than the second force.

Clause 4. The driver's seat (1) of clause 3, wherein the drive disconnects from moving the driver's seat (1) when a third force greater than the first is detected by the drive being applied to the driver's seat (1) against the first force.

Clause 5. The driver's seat (1) of clause 4, wherein the sensor (11) is inactive when the driver's seat (1) is in the driving position.

Clause 6. An occupant support comprising
a vehicle seat (1) movable relative to a floor (6) of a vehicle along a travelling path between a driving position in which the vehicle seat (1) is located adjacent controls of a vehicle such that the occupant can drive the vehicle and a relaxing position in which the vehicle seat is located in spaced-apart relation to the controls such that the occupant cannot drive the vehicle,
a drive arranged to extend between and interconnect the vehicle seat (1) to the floor (6) of the vehicle to cause the vehicle seat (1) to move between the driving position and the relaxing position,
wherein the drive causes the vehicle seat (1) to move from the relaxing position to the driving position in response to a trigger,
wherein a sensor (11) is configured to detect an obstacle in the travelling path and a send an output in response to detecting the obstacle.

Clause 7. The occupant support of clause 6, wherein the sensor (11) is configured to sense a distance between a front side of the vehicle seat and the obstacle.

Clause 8. The occupant support of clause 7, wherein the sensor (11) becomes less sensitive as the vehicle seat (1) approaches the driving position.

Clause 9. The occupant support of clause 8, wherein the sensor (11) is inactive when the vehicle seat (1) is in the driving position.

Clause 10. The occupant support of clause 7, wherein the obstacle is an occupant's foot.

Clause 11. The occupant support of clause 7, wherein the obstacle is an object (12).

Clause 12. The occupant support of clause 11, wherein the object (12) is located between the front side (3.1) of the vehicle seat (1) and an occupant's foot.

Clause 13. The occupant support of clause 6, wherein the output causes the drive to stop moving the vehicle seat (1).

Clause 14. The occupant support of clause 6, wherein the output causes an alarm to be provided.

Clause 15. The occupant support of clause 6, wherein the drive decreases a speed at which the vehicle seat (1) moves as the vehicle seat (1) approaches the driving position.

Clause 16. The occupant support of clause 6, wherein the drive provides a first adjustment force to move the vehicle seat (1) from the relaxing position to the driving position when the vehicle seat (1) is closer to the relaxing position than the driving position, the drive provides a second adjustment force to the vehicle seat (1) to move the vehicle seat (1) from the relaxing position to the driving position when the vehicle seat (1) is closer to the driving position than the relaxing position, and the first force is greater than the second force.

Clause 17. The occupant support of clause 16, wherein the drive disconnects from moving the vehicle eat (1) when a third force greater than the first is detected by the drive being applied to the vehicle seat against the first force.

The invention claimed is:

1. A driver's seat of a motor vehicle which can be moved by a drive from a rear relaxing position provided for driverless driving into a front driving position, wherein the drive automatically switches on when triggered, wherein a sensor configured to measure distance is arranged on a front side of a seat part of the driver's seat, the sensor detects obstacles such as the feet of the driver or objects on a travelling path of the driver's seat and triggers an alarm when the driver's feet or objects are in a hazardous position, wherein the sensor becomes less sensitive as the driver's seat approaches the driving position.

2. The driver's seat of claim 1, wherein the drive decreases a speed at which the driver's seat moves as the driver's seat approaches the driving position.

3. The driver's seat of claim 1, wherein the drive provides a first adjustment force to move the driver's seat from the rear relaxing position to the driving position when the driver's seat is closer to the rear relaxing position than the driving position, the drive provides a second adjustment force to the driver's seat to move the driver's seat from the rear relaxing position to the driving position when the driver's seat is closer to the driving position than the rear relaxing position, and the first force is greater than the second force.

4. The driver's seat of claim 3, wherein the drive disconnects from moving the driver's seat when a third force greater than the first is detected by the drive being applied to the driver's seat against the first force and wherein the sensor is inactive when the driver's seat is in the driving position.

5. An occupant support comprising
a vehicle seat movable relative to a floor of a vehicle along a travelling path between a driving position in which the vehicle seat is located adjacent controls of a vehicle such that the occupant can drive the vehicle and a relaxing position in which the vehicle seat is located in spaced-apart relation to the controls such that the occupant cannot drive the vehicle,
a drive arranged to extend between and interconnect the vehicle seat to the floor of the vehicle to cause the vehicle seat to move between the driving position and the relaxing position,
wherein the drive causes the vehicle seat to move from the relaxing position to the driving position in response to a trigger,
wherein a sensor is configured to detect an obstacle in the travelling path and a send an output in response to detecting the obstacle.

6. The occupant support of claim 5, wherein the sensor is configured to sense a distance between a front side of the vehicle seat and the obstacle, the sensor becomes less sensitive as the vehicle seat approaches the driving position, and the sensor is inactive when the vehicle seat is in the driving position.

7. The occupant support of claim 5, wherein the output causes at least one of the drive to stop moving the vehicle seat and an alarm to be provided.

8. The occupant support of claim 5, wherein the drive decreases a speed at which the vehicle seat moves as the vehicle seat approaches the driving position.

* * * * *